Patented Aug. 17, 1926.

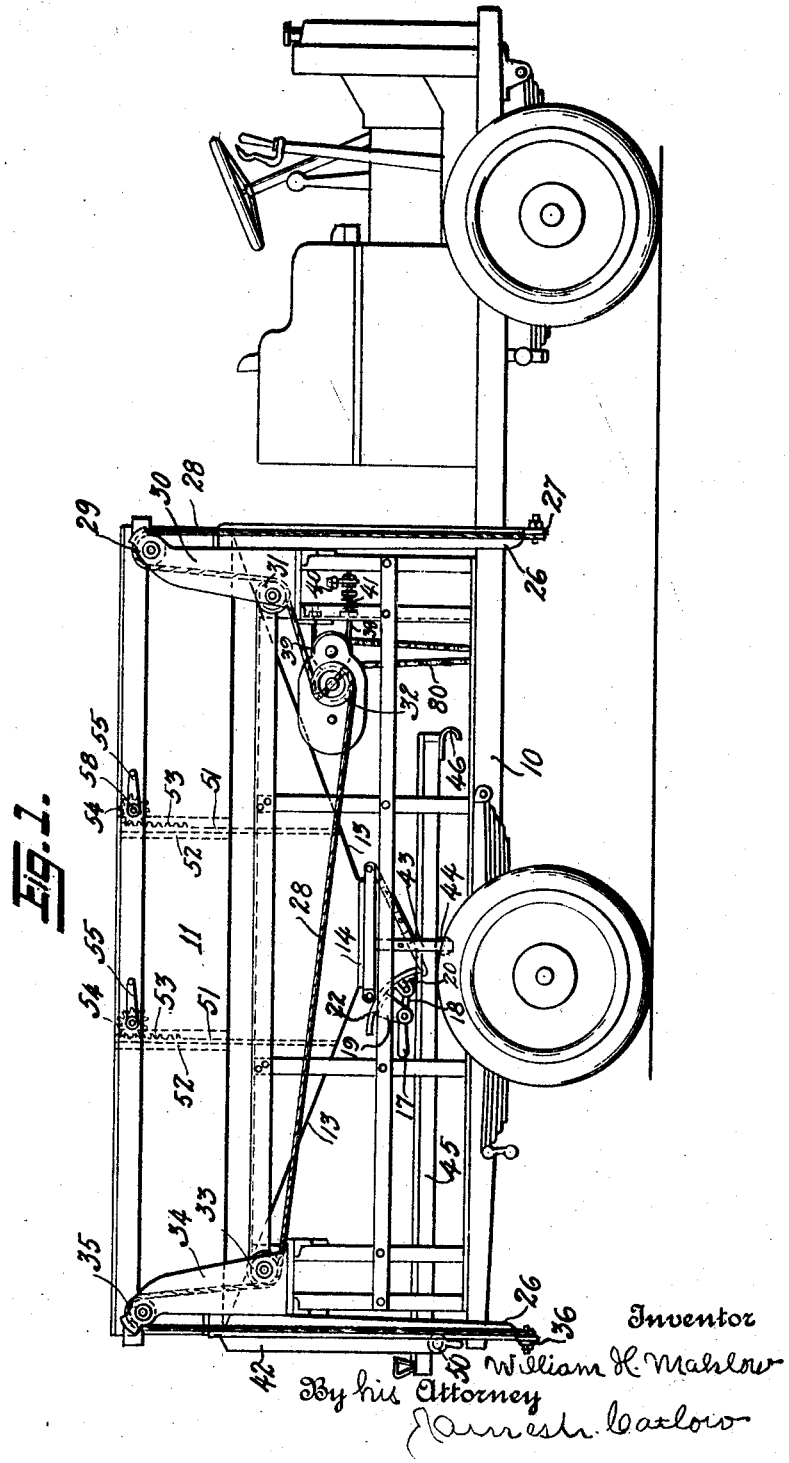

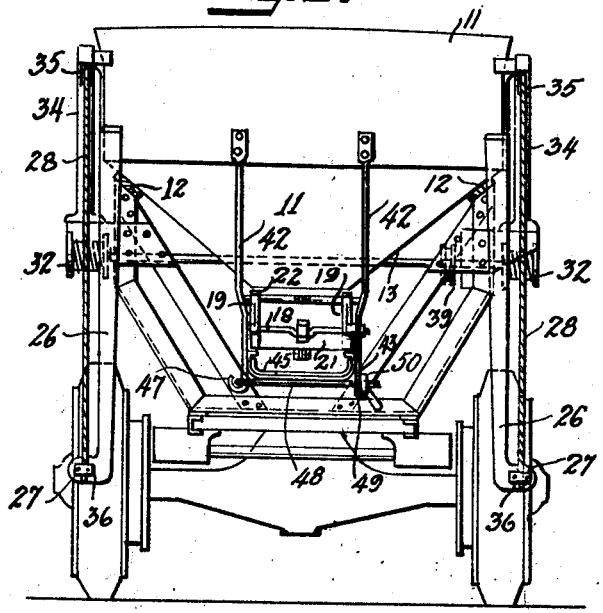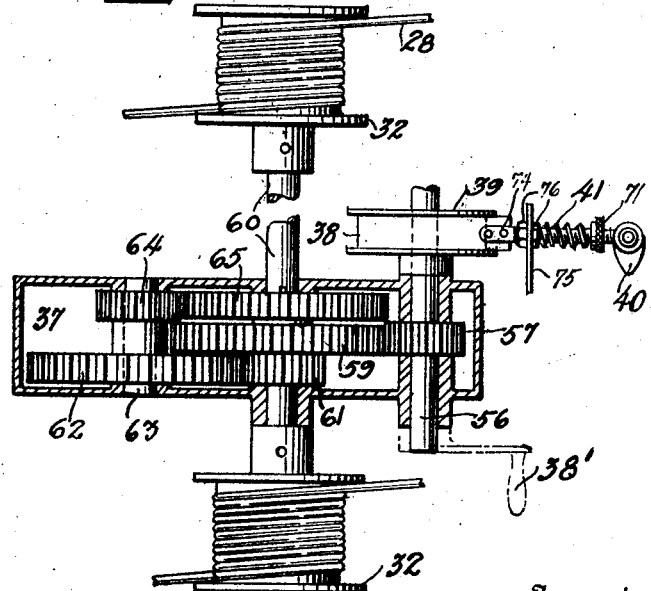

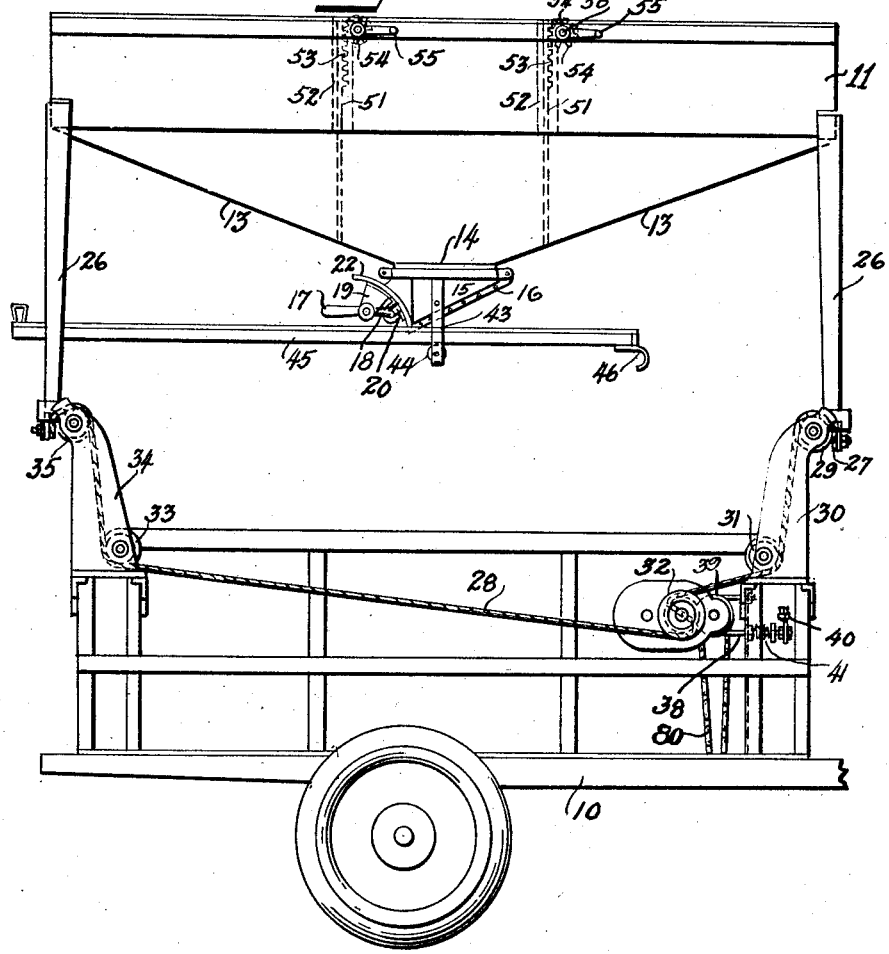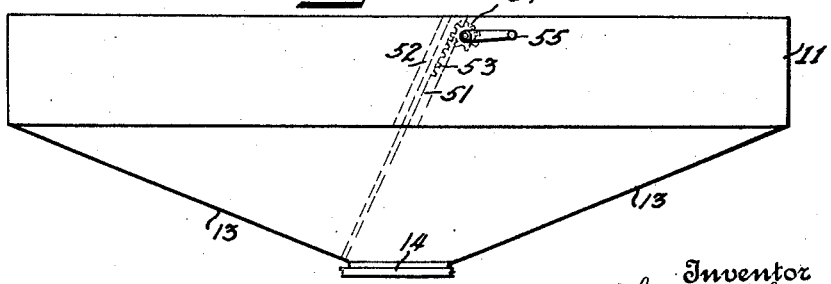

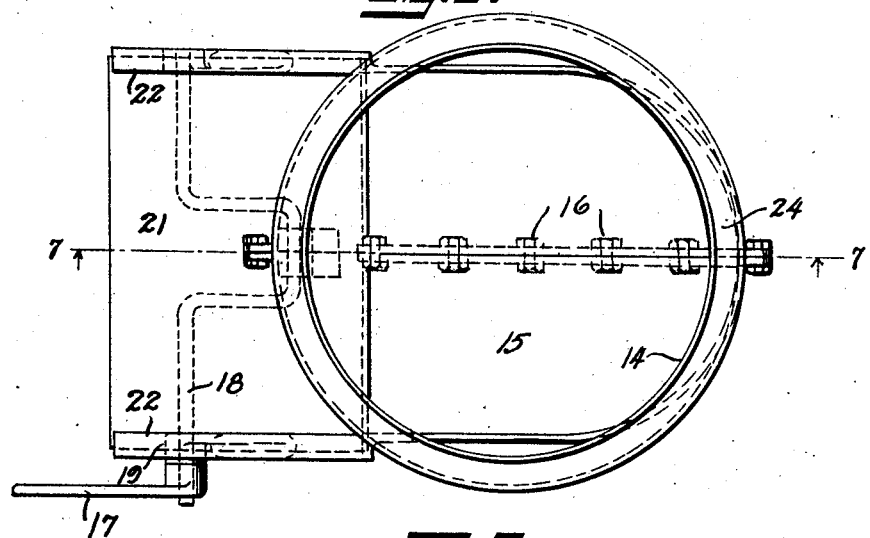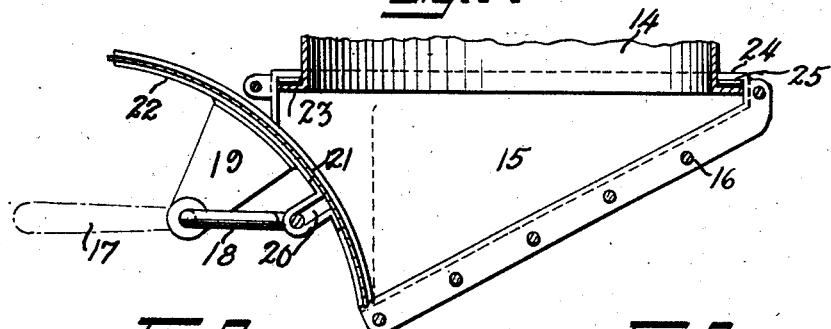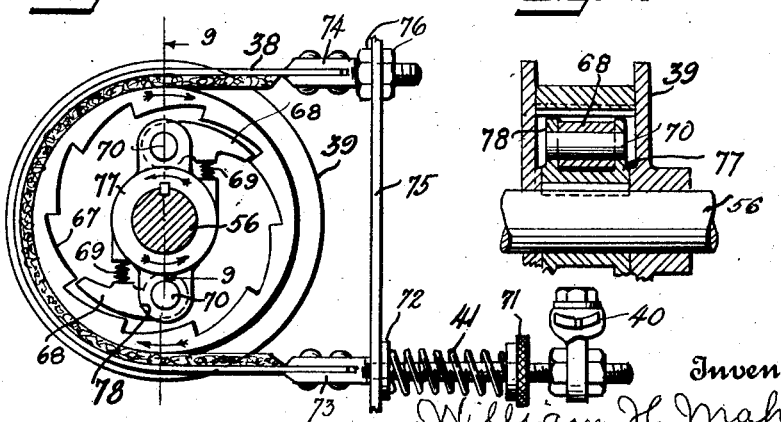

1,596,675

UNITED STATES PATENT OFFICE.

WILLIAM H. MAHLOW, OF LAWRENCE TOWNSHIP, MERCER COUNTY, NEW JERSEY, ASSIGNOR TO FRANK D. MOSES AND THOMAS WATSON, TRADING AS ATLAS BODY COMPANY, OF TRENTON, NEW JERSEY.

DUMPING VEHICLE.

Application filed March 21, 1924. Serial No. 700,779.

An object of this invention is to provide a truck body and means for raising the same in a vertical plane;

Another object of this invention is to so design the body as to permit the self-discharge of its contents from the bottom thereof;

Another object is to provide an exit control for the contents of the body;

Another object of my invention is to provide a chute adapted to register with the exist opening of the body so that the contents thereof may be carried to any desired point by gravity;

Another object of the invention is to telescopically carry the chute and to hold the same against jar;

Another object of the invention is to provide a brake release mechanism to control the downward movement of the body;

Another object is to provide division boards in the body and means for holding the same in a fixed position, and also for removing the same when desired.

Other objects will be apparent upon reading this specification in connection with the accompanying drawings, in which—

Fig. 1 is a side elevation of a truck embodying my improved body and means for raising the same;

Fig. 2 is a rear end elevation of the same;

Fig. 3 is an enlarged detailed view of the cable winding mechanism;

Fig. 4 is a side view of my body shown in lifted position;

Fig. 5 shows in modified position a division board;

Fig. 6 is a plan view of the hopper mechanism of my body;

Fig. 7 is a side view of the hopper mechanism of my body taken along the line 7—7 of Fig. 6 looking in the direction of the arrow;

Fig. 8 is an enlarged sectional view of the brake mechanism;

Fig. 9 is a fragmentary cross section of the same taken along the line 9—9 of Fig. 8.

Referring now in detail to the drawings in which the same reference characters refer to similar parts throughout, 10 is an automobile truck which may be made of any standard form; a body 11 is carried on said truck and when in lowermost position rests upon the beams 12 which are preferably made of wood or other relatively cushioning material. The bottom 13 of the body 11 is preferably made in sloping form so as to permit the precipitation of the contents of the body to the exit 14 which is kept closed except when it is desired to discharge contents of the body.

Preferably located at the centre of the bottom of the body and at a point to which the contents of the body will gravitate, is the hopper 15 which is more clearly shown in Figs. 6 and 7 of the drawings. This hopper is preferably made of pressed sheet metal, in two parts and riveted or spotwelded together at 16 as shown. The bottom of this hopper is disposed in a slanting position toward the gate 21, which gate is operated by a sliding motion through the handle 17 and bent shaft 18 adapted to arcuate movement in the lugs or standards 19. The bent or U portion of this shaft 18 passes through a loop 20 which is integrally connected to the gate 21. This gate is so mounted as to be normally maintained in closed position. The gate is adapted to slide in ways 22, which preferably consist of sheet metal channels. The hopper is suspended on the flange 23 of the collar 14, the said hopper being provided with a corresponding flange 24 for said purpose. Roller bearings 25 are provided to effect an antifriction connection between the hopper and the collar 14 on the arcuation of the hopper on the flange of said collar.

The body 11 is provided with legs 26, preferably four in number, one at each corner of the body, suspended therefrom at the top of said body; secured in the foot 27 of each of said legs is the end of a cable 28, of which there are two provided in the present embodiment, one on each side of the body. This cable 28 extends over the pulley 29 in the hollow standard 30, under the pulley 31 in said standard, onto the drum 32, through which it passes and from said drum under the pulley 33 in the hollow standard 34 and over the pulley 35 in said standard down to the foot 36, where it is securely held in place.

A drum 32 is mounted on each side of the body 11 and is controlled in its winding movement by a train of gears in the gear box 37, which may be actuated by the handle 38', or by the power of the automotive engine in any well known manner. The downward movement of the body is controlled by the brake mechanism, which consists of a brake band 38, in normal braking connection with the brake drum 39, and which may be released by manipulation of the brake lever 40, operating against the spring 41.

At the rear of the body I have provided a pair of suspender arms 42, and on the hopper 15, I have mounted a second pair of suspender arms 43. The suspender arms 43 are connected by a roller 44 on which the chute 45 is adapted to be shifted until the roller engages the hooks 46 at the inner end of the chute, when the end of the chute will be in register to receive material to be discharged through the hopper 15. One of the suspender arms 42 is provided at its lower end with a hook 47 in which is mounted the bar 48, the other end of which bar is adapted to be fitted into the hook 49 near the end of its cooperating suspender. The end of the bar 48 is preferably screw-threaded and the nut 50 co-operates therewith and when screwed down against the chute 45 holds the same against rattle.

The chute is slidable as shown, so that the entire length thereof may be disposed underneath the body 11 in telescoped position when not in actual use. The body 11 is provided with division boards 51 for the purpose of dividing the body into several compartments. These division boards are mounted in channels 52 in the sides of the body and the upper ends of said division boards are provided with racks 53 in mesh with pinions 54, which are operated by the handles 55. This rack and pinion mechanism is provided at both ends of the division board, and in order to operate the pinions in unison so as to raise the division board in a substantially even plane, the cooperating pinions are integrally secured to the connecting bar 58. Upon the handle 55 being turned so as to enable the racks 53 to clear the pinions 54 of the rack, the division board may be manually lifted from the body. When in position as shown in Fig. 1, however, the pinion holds the division board in locked position.

The train of gears in the gear box 37 consists of a driving pinion 57 mounted integrally on the operating shaft 56, which pinion 57 is in mesh with the idler gear 59 loose on the shaft 60. Connected to and adapted to move with the idler 59 is the pinion 61, also loose on the shaft 60. This pinion in turn engages the gear 62 mounted on and adapted to operate the shaft 63, on which shaft is also mounted to be operated thereby the pinion 64, which is in mesh with and operates the gear 65 secured to and adapted to operate the shaft 60, and the drums 32 secured on said shaft.

Mounted on the shaft 56 and adapted to rotate therewith is a yoke 77 having lugs 78 in which are mounted pawls 68, spring pressed by the springs 69 so as to hold them in engagement with the circular ratchet 67, formed on the inner surface of the brake drum 39.

Assuming the body is in the position shown in Fig. 1 and is loaded with material to be delivered, and the truck on which the body is mounted has been driven to the place of delivery, the body is raised vertically from the truck by manipulation of the shaft 56 in the direction of the arrow associated with said shaft in Fig. 8. This manipulation may be performed by means of a crank 38' attached to the end of said shaft 56 or the same may be by motor power through the drive chain 80. The rotation of the shaft 56 will carry with it the yoke 77 with the integral lugs 78 and the pawls 68, hinged at 70 in said lugs. By the action of the springs 69 the pawls are forced into engagement with the ratchet 67 which is held stationary by the action of the brake band 38 on the brake drum 39 with which said ratchet 67 is integrally connected. Upon the rotation of the shaft 56 it carries with it the pinion 57 which is in engagement with the gear 59. This gear has attached thereto and adapted to revolve therewith the pinion 61, the said gear 59 and pinion 61 being adapted to rotate freely on the shaft 60. The pinion 61 is in mesh with the gear 62 keyed onto the shaft 63 mounted in the gear box 37. Also mounted on said shaft 63 and adapted to rotate therewith is the pinion 64 which is in mesh with the gear 65, the latter gear being keyed to the shaft 60 and adapted to rotate therewith.

At the ends of the shaft 60 are the drums 32, one being located on each side of the truck. It will be seen that upon manipulation of the shaft 56 the reducing gears in the gear box 37 acting upon the shaft 60 will rotate the drums 32 and wind thereon the lifting cables, the opposite ends of which are connected to the feet 36 and 27 on the legs 26 and are carried under and over suitable pulleys so that the body may be raised until the feet 36 and 27 are at substantially the altitude of the pulleys 35 and 29 respectively, and the said legs being secured to the body 11, the said body is raised therewith so as to assume the position shown in Fig. 4.

When the body has been thus raised the bar 48 is lifted out of the hook 43 on one of the suspenders 42 and the chute 45 is arcuated so as to be given the desired position to discharge the contents of the body. The chute is then drawn forward on the roller 44 until the hooks 46 engage said roller when the upper end of the chute will be in register with the discharge end of the hopper 15. The handle 17 controlling the hopper gate is then pressed downward and the hopper gate consequently lifted and the contents of the body or the compartment thereof thus sought to be discharged, then gravitate onto the chute and are carried to their destination.

Where several compartments are in use in the body only one compartment is discharged at one time. Assuming the body is divided into three compartments as shown in Fig. 4, the centre compartment is the first one to be discharged. When this has been done either of the side compartments may be discharged by manipulating the crank 55 which controls the division board of the next compartment desired to be discharged. In like manner the third compartment may then be discharged. The control of the division board 51 by the pinion 54 and crank 55 is exercised for only a portion of its depth so that upon the manipulation of the pinion to a point beyond the rack the division board may be manually lifted from the body if desired. In Fig. 5, I have shown a modification where a two compartment body is desired.

Assuming that it is now desired to lower the body into its cradle, the brake release lever 40 is manipulated so as to release the brake band 38 and consequently the brake drum 39 which will release the train of gears in the gear box 37 and permit the body 11 to fall into its lowermost position by gravity. The speed of the downward movement of the body 11 may also be controlled by manipulation of the brake release lever 40. Adjustment means 71 and 72 are provided as shown, for the purpose of adjusting the brake band upon the brake drum.

I have described what I believe to be the best embodiment of my invention. I do not desire, however, to be limited in patent protection to the embodiment shown, but—

What I desire to cover by Letters Patent is set forth in the annexed claims.

1. An automobile dumping body having an exit opening in its bottom, a hopper adapted to be turned in register with said opening, an arcuately moveable gate adapted to control the exit opening of said hopper, and a crank lever having a chain link connection with said gate adapted to manipulate the same.

2. In combination with a dumping body, a hopper adapted to communicate with the interior of said body, means on said body for supporting said hopper so as to permit the same to be turned thereon, an arcuately moveable gate adapted to control the exit opening of said hopper, and a crank lever having a chain link connection with said gate adapted to manipulate the same.

3. An automobile dumping body having an opening in its bottom, a hopper turnably mounted on the body at said opening, a gate adapted to control the exit opening of said hopper, a crank lever having a chain link connection with said gate adapted to manipulate the same, a chute and means for suspending the same below said hopper, said chute being adapted to be turned with and slid beneath said hopper so that the elevated end of the same shall be in register with the exit opening of said hopper.

4. An automobile dumping body having an opening in its bottom, a hopper turnably mounted on the body at said opening, a gate adapted to control the exit opening of said hopper, a crank lever having a chain link connection with said gate adapted to manipulate the same, said gate being so mounted as to be normally closed, a chute and means for suspending the same below said hopper, said chute being adapted to be turned with and slid beneath said hopper, so that the elevated end of the same shall be in register with the exit opening of said hopper.

WILLIAM H. MAHLOW.